(12) United States Patent
Plumpe, Jr.

(10) Patent No.: US 6,622,472 B2
(45) Date of Patent: Sep. 23, 2003

(54) APPARATUS AND METHOD FOR THRUST VECTOR CONTROL

(75) Inventor: William Henry Plumpe, Jr., Brentwood, MO (US)

(73) Assignee: Gateway Space Transport, Inc., St. Louis, MO (US)

( * ) Notice: Subject to any disclaimer, the term of this patent is extended or adjusted under 35 U.S.C. 154(b) by 73 days.

(21) Appl. No.: 09/981,159

(22) Filed: Oct. 17, 2001

(65) Prior Publication Data

US 2003/0070417 A1 Apr. 17, 2003

(51) Int. Cl.[7] .......................... B63H 11/00; B64G 9/00; F02K 9/00; F03H 9/00; F23R 9/00
(52) U.S. Cl. .................. 60/204; 60/232; 239/265.19; 239/265.33; 239/265.37
(58) Field of Search ................ 60/204, 229, 230, 60/232; 239/265.19, 265.23, 265.33, 265.37

(56) References Cited

U.S. PATENT DOCUMENTS

| | | | |
|---|---|---|---|
| 3,537,355 A | | 11/1970 | Bliss .......................... 91/51 |
| 4,000,854 A | | 1/1977 | Konarski et al. ...... 239/265.35 |
| 4,307,799 A | | 12/1981 | Zouzoulas .................. 192/150 |
| 4,754,690 A | | 7/1988 | Louis et al. .................... 91/51 |
| 4,778,109 A | * | 10/1988 | Jourdain et al. ........ 239/265.27 |
| 4,836,451 A | * | 6/1989 | Herrick et al. .......... 239/265.27 |
| 4,994,660 A | * | 2/1991 | Hauer .................... 239/265.41 |
| 5,076,496 A | * | 12/1991 | Lippmeier ............. 239/265.41 |
| 5,082,182 A | * | 1/1992 | Bruchez et al. ........ 239/265.35 |
| 5,150,839 A | * | 9/1992 | Reedy .................... 239/265.41 |
| 5,285,637 A | * | 2/1994 | Barcza .................. 239/265.35 |
| 5,328,098 A | * | 7/1994 | Barcza et al. .......... 239/265.35 |
| 5,335,489 A | * | 8/1994 | Thayer ...................... 60/230 |
| 5,351,888 A | * | 10/1994 | Taylor et al. ............. 239/127.3 |
| 5,485,959 A | * | 1/1996 | Wood et al. ........... 239/265.41 |
| 5,680,755 A | * | 10/1997 | Hauer et al. .................. 60/266 |
| 5,687,907 A | * | 11/1997 | Holden .................. 239/265.35 |
| 5,706,649 A | * | 1/1998 | Robinson et al. .......... 60/226.2 |
| 5,779,152 A | * | 7/1998 | Renggli et al. ........ 239/265.33 |
| 6,067,793 A | * | 5/2000 | Urruela et al. ................. 60/230 |
| 6,195,981 B1 | * | 3/2001 | Hanley et al. ................. 60/204 |
| 6,199,772 B1 | * | 3/2001 | Renggli ................. 239/265.33 |
| 6,327,846 B1 | * | 12/2001 | Feder et al. ................... 60/232 |
| 6,349,539 B1 | * | 2/2002 | Feder et al. ................... 60/232 |

FOREIGN PATENT DOCUMENTS

EP 0 833 046 A2 4/1998 ............ F02K/1/00

OTHER PUBLICATIONS

PCT International Search Report Issued Mar. 13, 2003, Application No. PCT/US02/32952.

* cited by examiner

Primary Examiner—Charles G. Freay
Assistant Examiner—William H. Rodriguez
(74) Attorney, Agent, or Firm—Husch & Eppenberger, LLC; Robert C. Haldiman, Esq.; Grant D. Kang, Esq.

(57) ABSTRACT

A multi-lobed, low friction vane, thrust vector controller is disclosed. Low friction vanes are independently movable into and out of the thrust of the exhaust of a jet engine. All vanes may be used together to adjust exhaust surface area to maximize thrust and fuel efficiency in varying conditions. Vanes also move independently to impart directional force to roll, pitch and yaw traditional aircraft and hover VTOL aircraft. A bleed air pressure actuator for moving the vanes is disclosed.

17 Claims, 12 Drawing Sheets

APPARATUS AND METHOD FOR THRUST VECTOR CONTROL

CROSS-REFERENCE TO RELATED APPLICATIONS

None

STATEMENT REGARDING FEDERALLY SPONSORED RESEARCH OR DEVELOPMENT

None

BACKGROUND OF THE INVENTION

1. Field of the Invention

The present invention relates generally to efficient control of thrust vectors for jet and turbo jet engines and the actuation of their control surfaces.

2. Prior Art

Thrust vector control of propulsive jet engine exhaust is desirable for a variety of applications including emergency safety steering control, reducing G force loads on aircraft control surfaces, enabling higher G turn capabilities for aircraft, optimizing engine thrust, fuel economy and thrust response time and for application in engines used in aircraft design to hover or execute vertical takeoff and landing or very short takeoff and landing. Currently available thrust vector control systems provide only coarse control. In order to provide fine control of current thrust vector controllers, auxiliary systems are necessary. These systems typically involve smaller thrusting devices remote from the main engine exhaust. Consequently, complex and expensive ducts, reservoirs, pumps and the like are required. The complexity of these systems decrease reliability and durability while increasing expense. Thrust vector control for jet propulsion of all kinds of aircraft has a constant need for increasing economy, durability, reliability and safety.

Even the coarse control currently available with current thrust vector control systems typically involves overlapping vanes or plates which generate a high amount of friction with one another and/or their housings in operation. Hence even for coarse control a high actuation force is required. High actuation force again requires a complex and expensive system of hydraulic or mechanical actuators. Both these systems and auxiliary fine vector thrust control systems present risks of fire, inoperability and engine contamination in case of leaks or other failures. When high force is required at high thrust levels, present systems are not always capable of providing the required actuation force under all conditions, especially low speed applications such as VTOL.

The expense and complexity of the currently available actuation systems make retrofitting thrust vector control systems onto existing jet engines impractical and expensive. As lighter and cheaper jet engines are brought to market for applications with smaller aircraft, affordable and reliable retrofitting systems become attractive. Moreover, the availability of retrofitting capabilities is desirable for use of thrust vector controllers as an emergency safety system.

SUMMARY OF THE INVENTION

The present invention is a multi-lobed, low friction vane thrust vector controller for jet propulsion engines. A housing is disposed around a jet engine exhaust. The housing has four brackets, aligned in perpendicular opposing pairs. In each bracket a curved vane is pivotally installed. The vanes may be pivoted inward to restrict or outward to open exhaust flow through each bracket. The vanes are independently controllable. Accordingly, the vanes may be pivoted inward to constrict exhaust flow in an individual bracket, or in any combination of multiple brackets. By selectively constricting the flow of propulsive exhaust gas in the four brackets, the engine thrust vectors may be controlled. The amount of thrust vectoring is controlled by the degree to which a vane is pivoted.

Each vane has an independent actuator. The actuator is powered by bleed air from the main chamber of the jet engine. Bleed air is shunted into a sealed cylinder having a piston in it. The path of the incoming air is down an axial shaft, out a port in the piston between the edge of the piston and the wall of the cylinder and then into chambers on either side of the piston. The piston is fixed to a piston rod which extends from the cylinder to its pivotal attachment with the vanes it actuates. Hence, movement of the piston in one direction pushes the connected vane into the exhaust thrust and movement of the piston the other direction withdraws the vane from the exhaust thrust.

The constant flow of air through all parts of the cylinder cools it. This allows for a compact design, since a self-cooled piston and cylinder actuator may be placed close to the jet combustion chamber without the need for expensive high temperature bearings or the risk of temperature related degradation.

The direction of piston and piston rod travel is controllable through a pair of control ports in the piston shaft. One control port connects the hollow piston rod air exhaust with a first chamber on one side of the piston and the other port connects the hollow piston rod air exhaust with a second chamber on the other side of the piston. A valve coaxial with the piston rod and traveling through its hollow shaft selectively opens one or the other control port. By opening one or the other port, air pressure is increased in one chamber and decreased in the other, driving the piston to move towards the low-pressured chamber. The piston rod moves with the piston and actuates the vane.

Only a small amount of force is necessary to close one control port and open the other because of the actuator cylinder's use of dynamically opposing air pressure chambers. Movement of the piston is initiated by a control port selection valve connected to a shaft. The valve shaft runs from the valve within the piston/piston rod assembly and out to a housing where it is connected to a gear rack. Through a pinion gear a servo motor drives the gear rack and valve shaft to move the control port selector valve between the pressure control ports. An ordinary electric motor operated by a 12-volt battery is sufficient.

Through the independent control of thrust vector control vanes in the described manner, the present invention is capable of inexpensive, robust, reliable, and retrofitable control of pitch, yaw, and roll. It can optimize thrust, thrust response time, and fuel economy for various altitudes and speeds. It is useful for applications as an emergency back up steering system, and for short takeoff and landing and vertical takeoff and landing applications, especially those requiring hover control.

Further features and advantages of the present invention, as well as the structure and operation of various embodiments of the present invention, are described in detail below with reference to the accompanying drawings.

DETAILED DESCRIPTION OF THE PRESENT INVENTION

Figure 1:
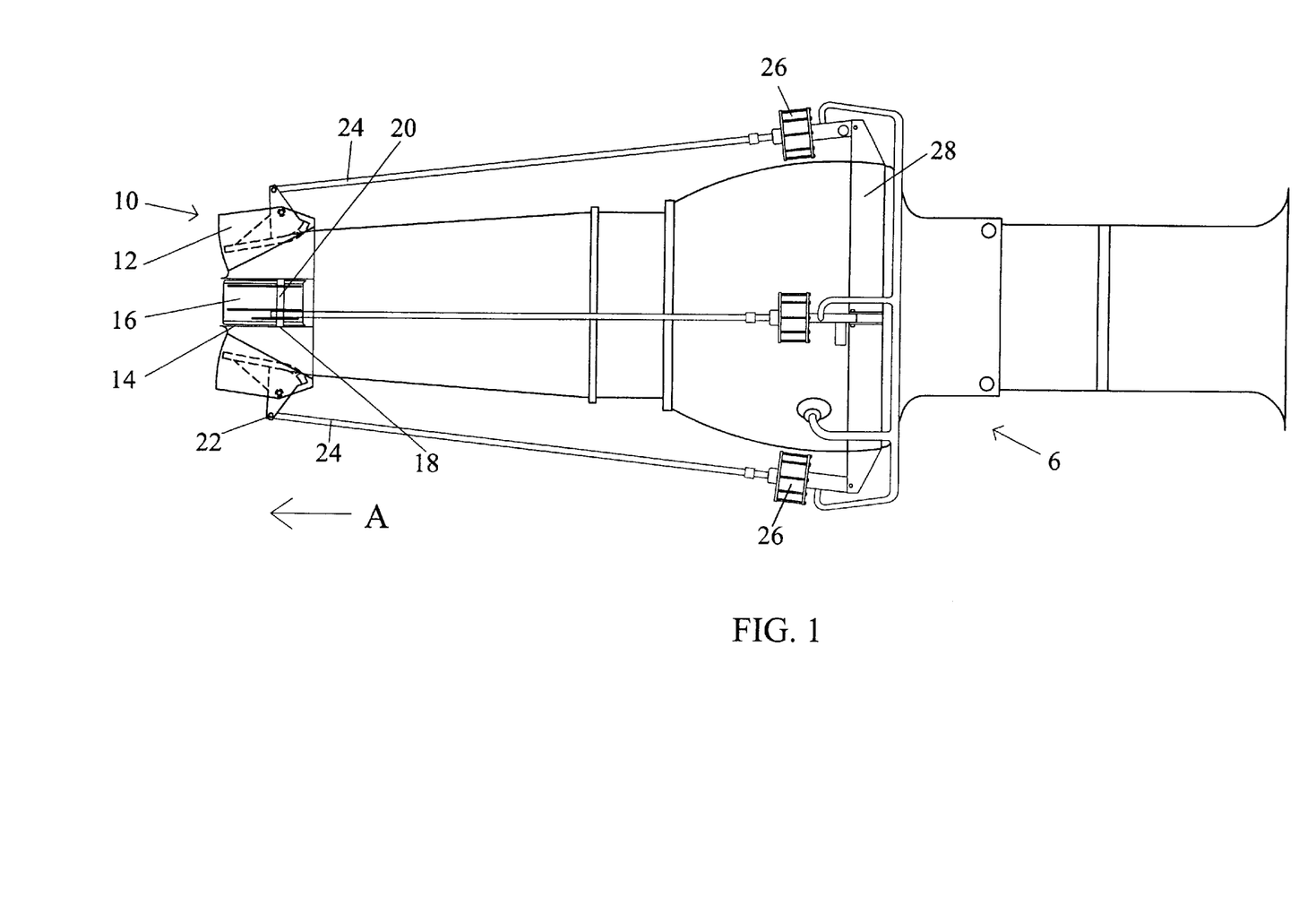
FIG. 1 is a side view of a jet engine with the thrust vector controller of the present invention installed.

Referring now to the figures where like reference numbers indicate like elements of the present invention, FIG. 1 is a side view of a jet engine with the thrust vector controller of the present invention installed. Propulsive exhaust exits the engine at the right of the figure in the direction indicated by arrow A. Thrust vector control housing, 10, has four brackets, 12, each comprised of a pair of bracket walls, 14. Each bracket, 12, holds a vane, 16. Vanes pivot around fulcrums, 18, on fulcrum rods, 20. Vanes, 16, are rotated around fulcrum, 18, by pressure on actuation pivot, 22. Pressure is applied to actuation pivot, 22, via piston rods, 24. Piston rods, 24, are extended and retracted by pistons in cylinders, 26, which are pivotally mounted on the jet engine body by housing 28.

Figure 2:
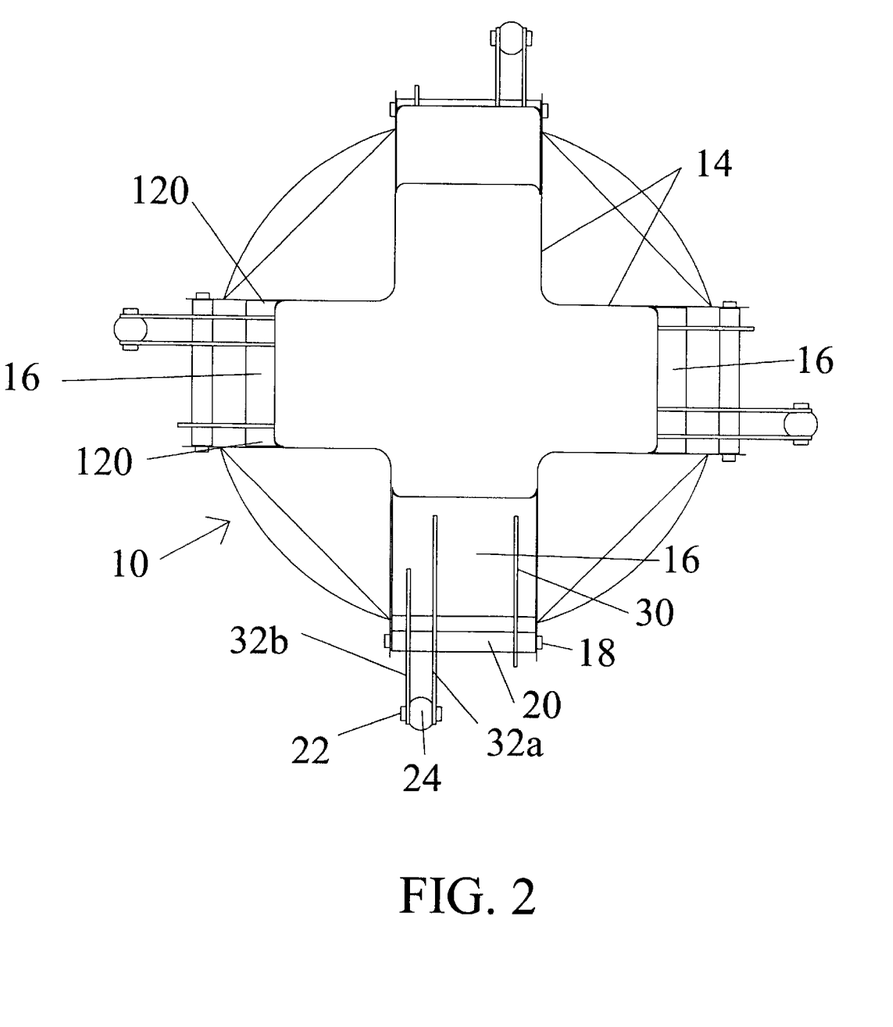
FIG. 2 is a rear view of the thrust vector controller of the present invention.
Figure 2A:
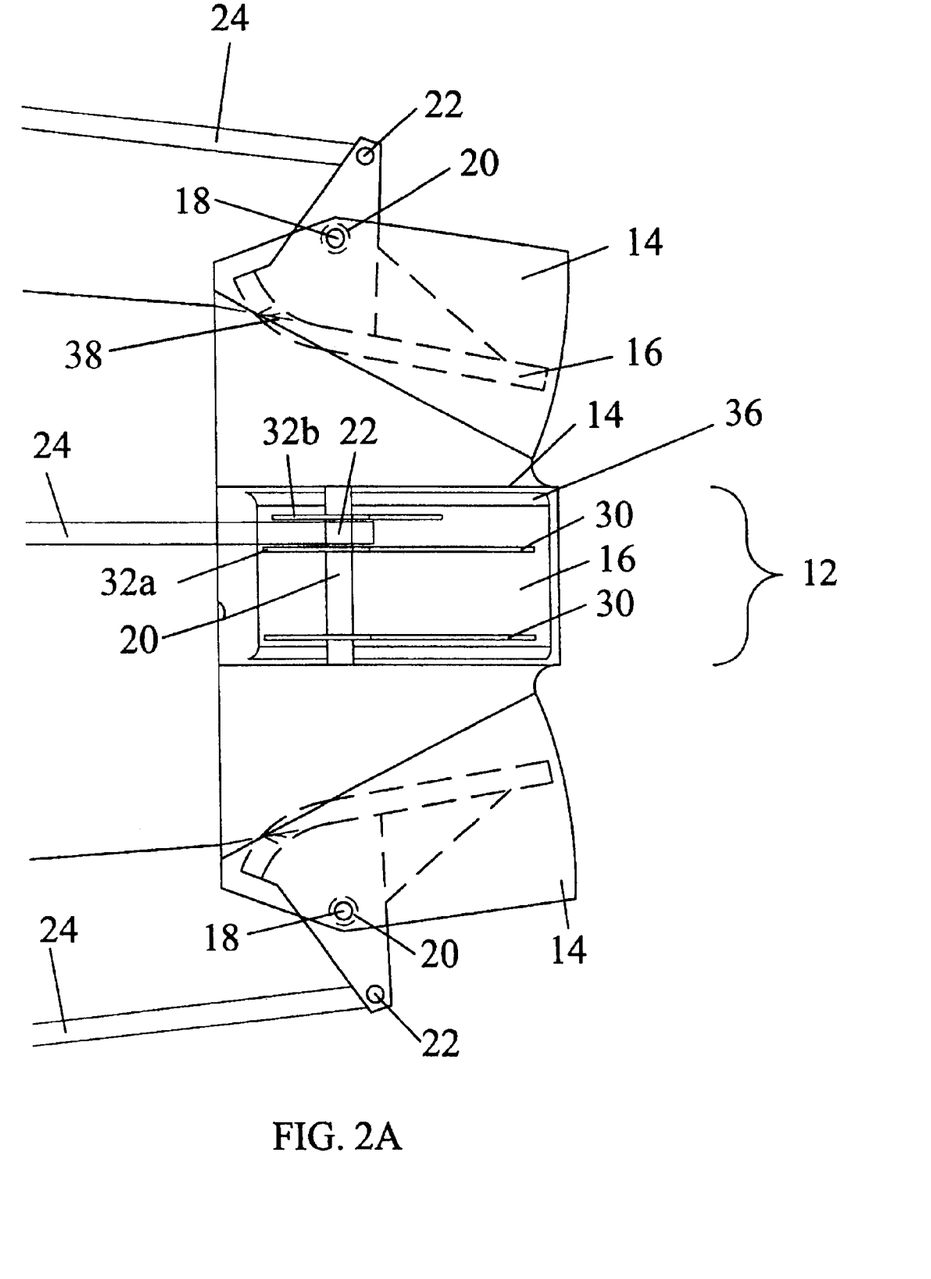
FIG. 2A is a side view of the thrust vector controller of the present invention.

As best seen in FIGS. 2 and 2A, four brackets are radially disposed perpendicular to the direction of exhaust thrust, which is out of the page, towards the viewer in FIG. 2. Within each bracket, 12, a vane, 16, is disposed between bracket walls, 14. Fulcrum rod, 20, is pivotally anchored to bracket walls, 14. Vane, 16, is fixedly attached to fulcrum rod, 20, by fulcrum rod mounts, 30. Actuator pivot, 22, is rotatably mounted on actuator pivot mounts, 32, which are fixedly attached to vane, 16. Actuator piston rod, 24, is pivotally attached to pivot, 22, at piston rod mounts, 32A and 32B.

The only contact between vanes, 16, and bracket walls, 14, is at fulcrum rod, 20. The edges of vanes, 16, move in close cooperation with bracket walls, 14, but do not touch them. This feature maintains a nearly frictionless interaction between vanes, 16, and brackets, 12, which allows for a finer degree of control of the thrust vectors. Low friction also decreases the amount of actuation power required and makes the system more robust. The vanes are curved at their edges, concave towards the exhaust, to seal the gap between the vane and the bracket wall.

To promote the tightest possible seal between the edges of the vanes, 16, and the bracket walls, 14, while still maintaining their frictionless relationship, vane elbows, 120, are fixedly attached to vanes, 16. Vane elbows, 120, are welded to vanes, 16, in the depicted alternative embodiment. While the edges of vane, 16, operate in moderately close tolerance with bracket walls, 14, some of the high pressure exhaust thrust will be lost through the gap between them. A major portion of this lost thrust is recaptured by backing the gap between the edges of vane, 16, and bracket walls, 14, with vane elbows, 120. Multiple elbows may be used. The depicted embodiment has one elbow per vane edge.

Similarly, deflectors, 38 may be installed between the flat end of the curved air flow continuity surface, which is the forward end of each vane. These deflectors can be installed on the tailpipe to re-direct and contain any exhaust leaking between the vane and the tailpipe.

Figure 3A:
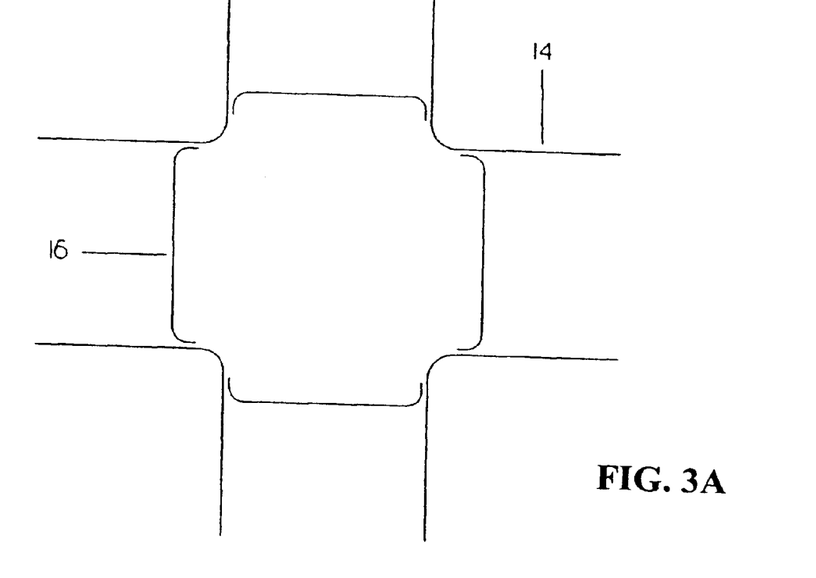
FIGS. 3A and 3B are schematic rear views of the thrust vector controller of the present invention showing control vanes in the constricted and open positions.
Figure 3B:
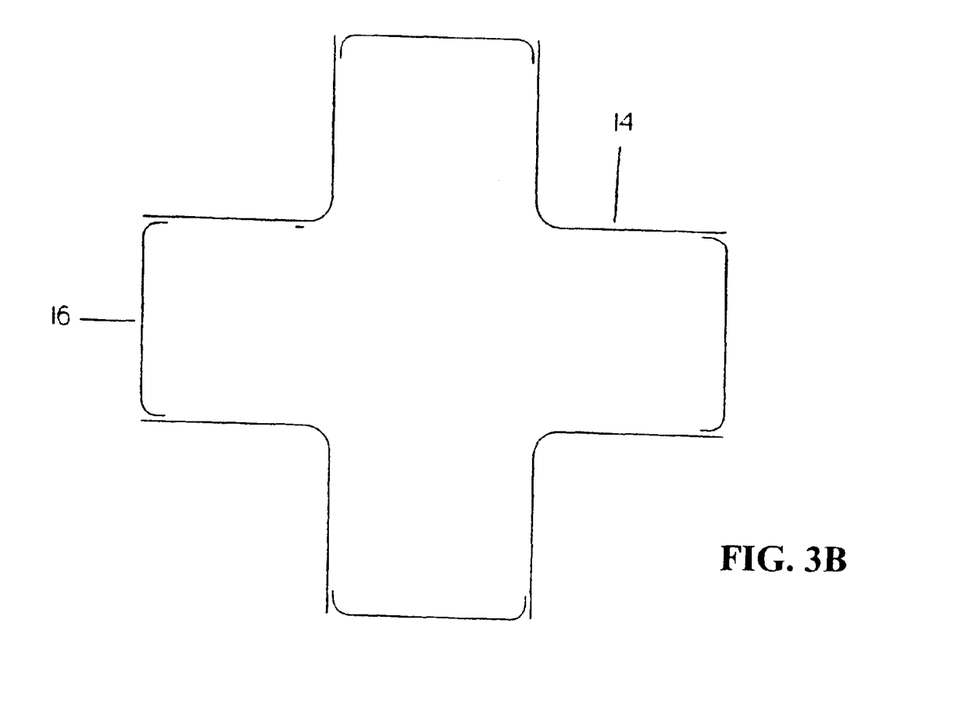

FIGS. 3A and 3B, 4A and 4B and 5A and 5B schematically illustrate various positions in which the vanes may be placed in order to control the thrust vectors of the propulsive jet exhaust. FIG. 3A shows all four vanes, 16, in their closed, constricting position. In this configuration, the thrust vector remains parallel to the thrust axis of the jet engine, (which is again out of the page in these Figures). In FIG. 3B, all four vanes, 16, have been radially expanded to their outermost, open position giving full flow to the propulsive jet exhaust, which also remains parallel to the axis of the jet engine in this configuration. The vanes may be adjusted to intermediate positions (not shown). Constricting all four vanes, 16, simultaneously chokes the propulsive jet exhaust, thereby increasing thrust on the vehicle by forcing the same volume of exhaust gases through a smaller opening, which requires faster exhaust flow.

Symmetrical constriction of the vanes generally increases thrust. Continuing constriction of the vanes and reduction of the surface area through which exhaust gases must travel eventually leads to excessive back pressure on the jet engine which has the result of decreasing thrust and decreasing the efficiency of the engine's operation. There is a distinctly identifiable point along a continuum of decreasing exhaust surface area at which there is a transition from increasing thrust and efficiency to decreasing thrust and efficiency caused by back pressure. The amount of surface area, and vane constriction, at which this transition occurs varies according to altitude, speed, meteorological conditions, mixture, rpm and the like. Simultaneous constriction and expansion of the vanes of the present invention allow for optimization of thrust and fuel efficiency for any jet engine with such optimization being almost immediately responsive to varying conditions, either through automatic sensor feedback or pilot control.

The ability to choke or open the exhaust surface area almost immediately provides an added advantage for low speed applications. For short takeoff and landing applications and especially for vertical takeoff and landing and hovering applications, jet engine response time to demands for increased thrust are critical. Normal jet engines, and jet engines controlled according to the existing art, have slow response times due to long jet turbine spool up times. Constriction of the vanes of the present invention, however, may be done almost immediately. Accordingly, jet exhaust surface area may be constricted quickly, and thrust increased quickly by use of the present invention.

Figure 4A:
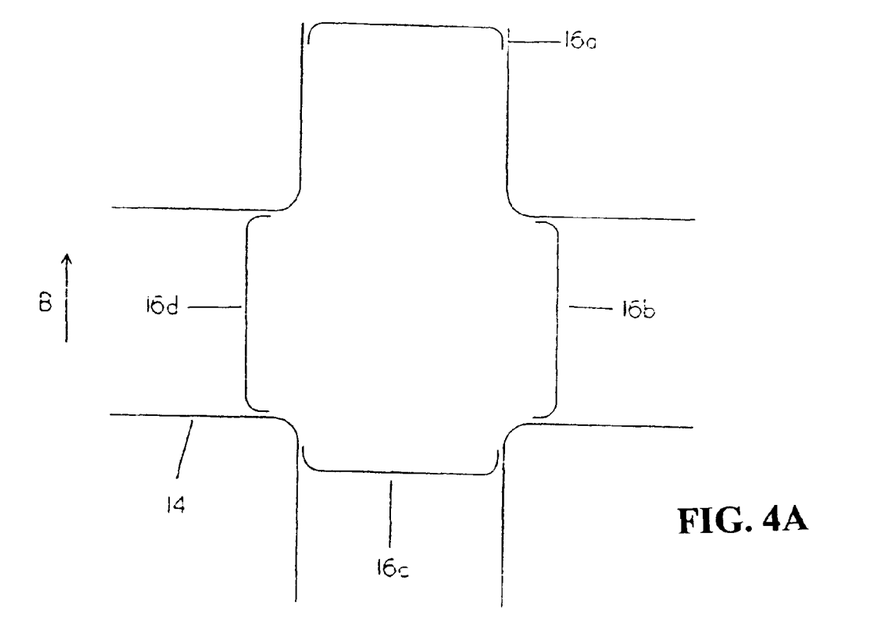
FIGS. 4A and 4B are schematic rear views of the thrust vector controller of the present invention showing control vanes vectoring thrust in the pitch and yaw directions.

FIGS. 4A and 4B illustrate vector controlling with a single vane. In FIG. 4A, a single vane, 16A, is in its outward position while the other three vanes, 16B, 16C and 16D are in their constricting positions. Constricting vane, 16C, will exert an inward pressure on the propulsive exhaust thrust, while expanded vane, 16A, releases pressure on the parallel but opposite side of the exhaust. The result of this control configuration will be to direct exhaust in the direction of arrow B. For most aircraft configured with the jet exhaust at or behind the center of gravity, controlling the exhaust to move in the direction indicated by arrow B will have the effect of moving the aircraft in the same direction. Stated conversely, the vane, 16C, moved into the exhaust flow will have a trust vector act upon it to push it and the tail of the aircraft in a direction opposite arrow B, tipping the nose of the aircraft in the same direction as arrow B. For example, if the axis of arrow B is pitch, the thrust vector control configuration illustrated in FIG. 4A would pitch the aircraft traveling away from the viewer with its nose towards the top of the page.

Figure 4B:
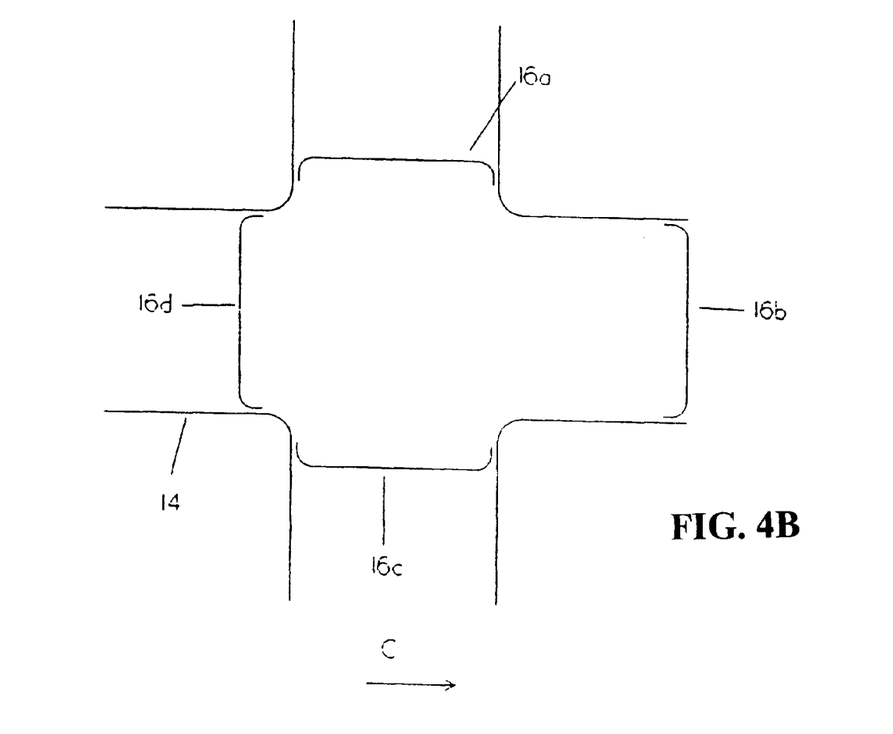

Similarly, yaw may be controlled by an individual vane. In FIG. 4B, vane 16B is in its outward position while vanes 16A, 16C and 16D are in their constricted positions which will vector exhaust in the direction indicated by arrow C and yaw a typical aircraft nose in the same direction indicated by arrow C.

Figure 5A:
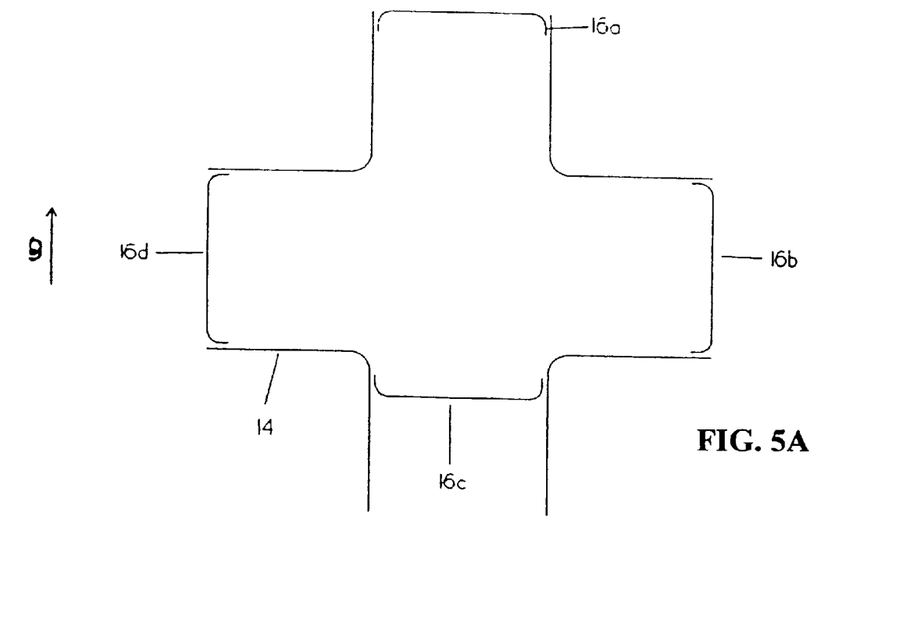
FIGS. 5A and 5B are schematic rear views of the thrust vector controller of the present invention depicting control vanes in an alternative position to vector thrust in the pitch and yaw directions.
Figure 5B:
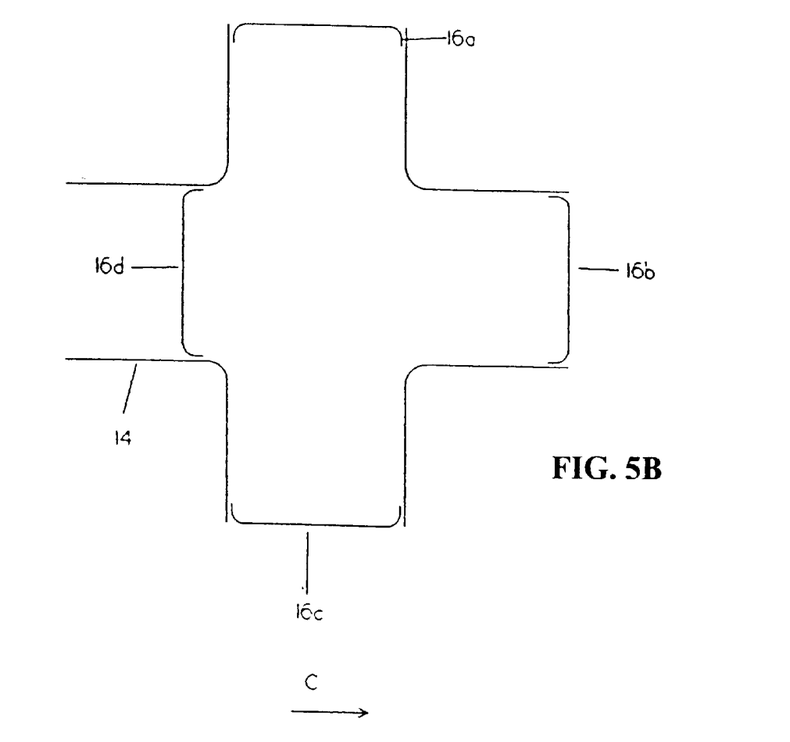

FIGS. 5A and 5B are identical to FIGS. 4A and 4B except that the pair of vanes perpendicular to the pair of vanes exerting a controlling force on the thrust vector are open instead of constricted. In FIG. 5A, vane, 16A, is open while 16C is constricted, again directing exhaust in the direction of arrow B. In FIG. 5A, the perpendicular vanes, 16B and 16D, are open instead of constricted, reducing overall thrust.

In FIG. 5B, vanes 16B and 16D are in a vector controlling position. Vane 16D is constricted while vane 16B is open, again directing exhaust in the direction of arrow C. Perpendicular vanes 16A and 16C are open. The ability to control sideways directional vectors while simultaneously controlling the amount of thrust by constricting or opening the perpendicular pair of vanes that are not being used for directional control, allows for directional thrust vectoring during either high or low thrust maneuvers. It is particularly useful to be able to control directional thrust vectoring during high thrust maneuvers, such as hovering or vertical takeoff and landing.

Figure 6A:
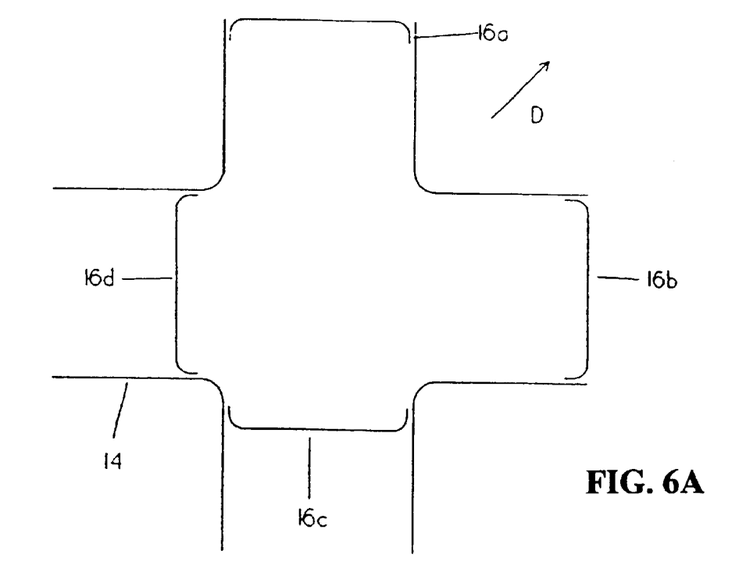
FIGS. 6A and 6B are schematic rear views of the thrust vector controller of the present invention depicting control vanes vectoring thrust along intermediate vectors between pitch and yaw.

Vector control may be more finely adjusted than by simply moving perpendicular vanes individually for thrust vector control in 90° increments. By moving adjacent vanes, thrust may be vectored in any direction. In FIG. 6A, vanes at 16A and 16B are both open, while vanes 16C and 16D are both constricted. Vanes 16C and 16D will combine to control the thrust vector by directing exhaust in the direction indicated by arrow D.

Figure 6B:
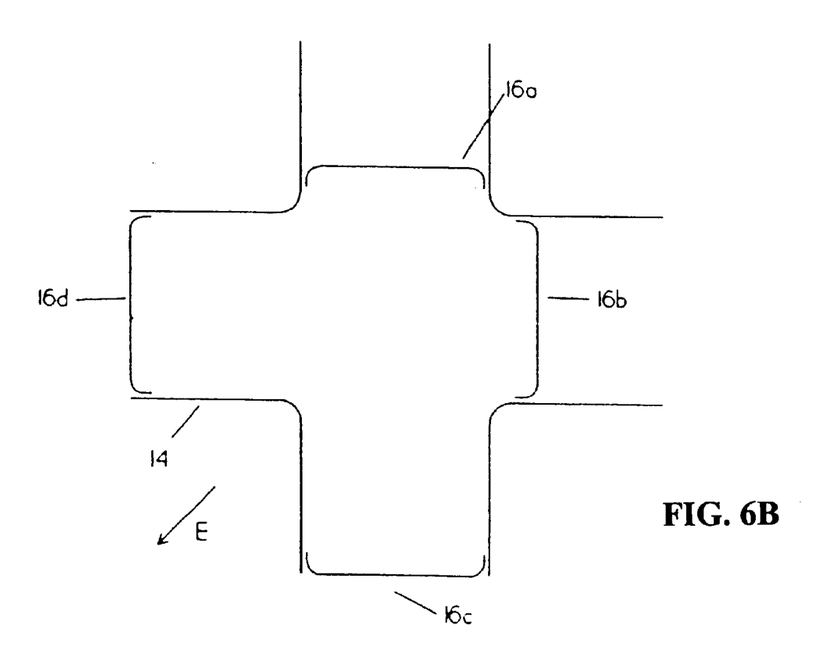

FIG. 16B illustrates the converse thrust vector control configuration. Vanes 16A and 16B are constricted while vanes 16C and 16D are open, generating a thrust by vectoring exhaust in the direction indicated by arrow E.

Each vane is controlled individually. Accordingly, any amount of rotation on any individual vane is achievable. Accordingly, any combination of controlling force exerted by the vanes may also be achieved. By adjusting individual vanes in complimentary increments, any angle of thrust vectoring is achievable. The present invention may thereby direct thrust in any direction, through 360°.

In addition, each vane is adjustable to any angle of pressure on exhaust thrust between the depicted fully open and fully closed constricting positions. In this manner not only the thrust vector direction, but the amount of thrust force may be controlled. This allows for simultaneous direction control by thrust vector control and optimization of thrust and fuel efficiency by exhaust surface area control at various altitudes and speeds.

The depicted alternative embodiment has four brackets, or thrust vector control lobes. It is contemplated to be within the scope of the present invention to have any number of vector control lobes and vanes.

It is further contemplated to be within the scope of the present invention that roll may be controlled by this thrust vector controller. In a multi-engine vehicle, with the thrust vector controller of the present invention applied to two or more engines, roll may be controlled without modification from the alternative embodiment depicted in the figures. The aircraft may be selectively rolled by adjusting the thrust vector controller on one engine upwards and the opposing engine downwards, or visa versa.

Roll may also be controlled even in single engine aircraft by using twisted vanes, curvilinear vanes, or split vanes independently controllable within a single lobe, which are also contemplated to be within the scope of the present invention. Alternatively or additionally, movement of vanes may be directed along a roll controlling path.

Figure 7:
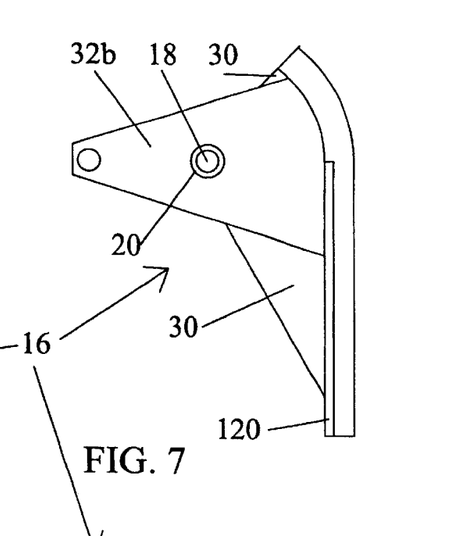
FIG. 7 is a side view of control vane of the present invention.
Figure 8:
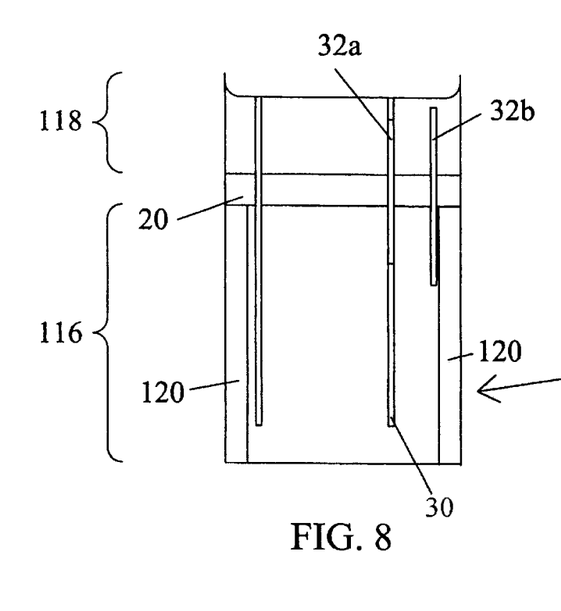
FIG. 8 is a top view of a control vane of the present invention.
Figure 8A:
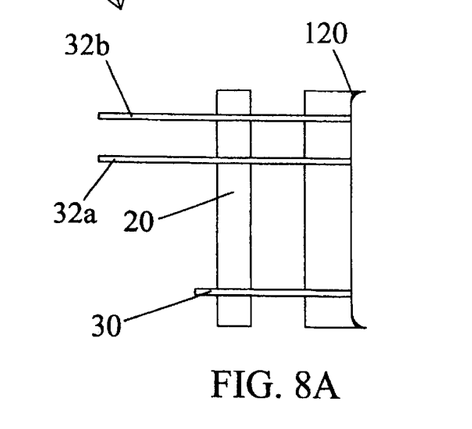
FIG. 8A is an end view of a control vane of the present invention.
Figure 9:
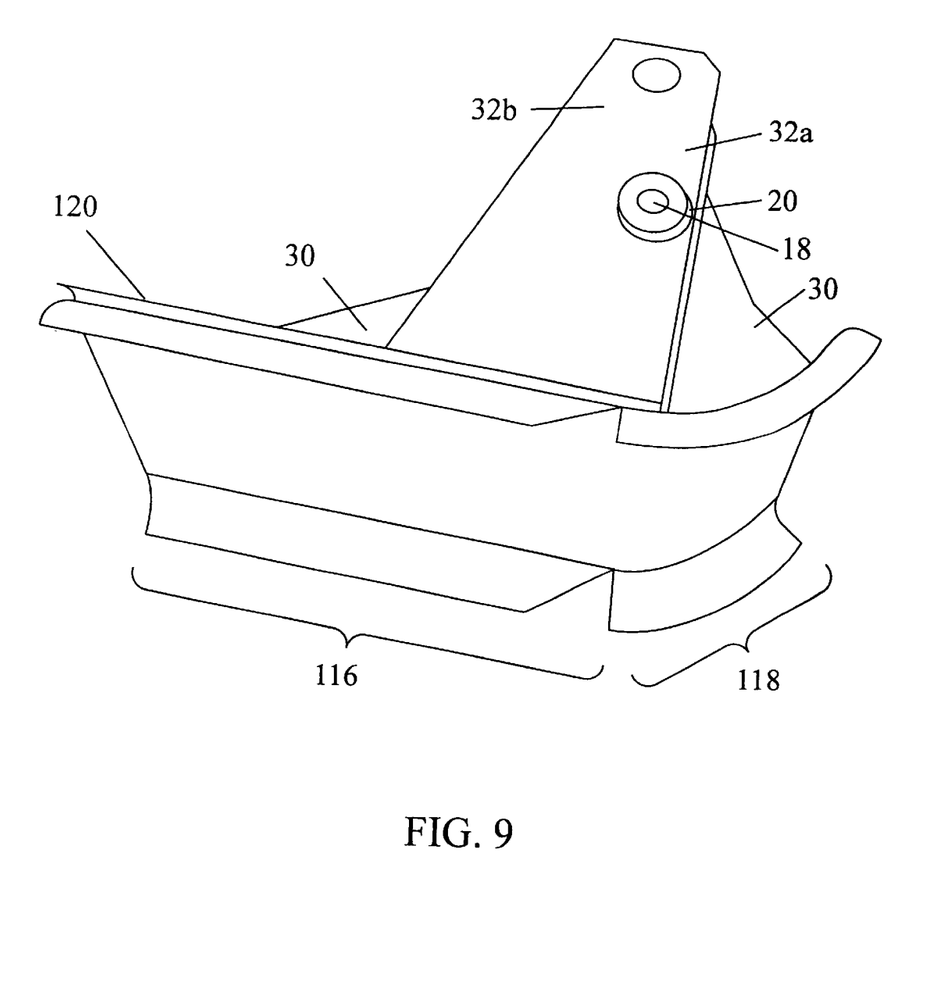
FIG. 9 is a perspective view of a control vane of the present invention.

FIGS. 7 is a side view, FIG. 8 a top view, and FIG. 8A an end view of an individual vane, 16. FIG. 9 is a perspective view of the vane, 16. The operative surface of the vane is comprised of a flat pressure surface, 116, and a curved surface, 118. When the vane is closed to its constricted position, the flat surface, 116, exerts thrust vector controlling pressure on the propulsive jet exhaust. When the vane is in its out position and during travel from the closed, constricted position to the out position, the curved section, 118, maintains a smooth air flow surface along the continuous interface of the multi-lobed thrust vector control unit. Curved surface, 118, therefore comprises an air flow continuity surface. Any leakage between this surface and the tailpipe may be reduced by deflectors. Vane fulcrum, 18, is held in place by mounts, 30.

Actuation pivot (not shown) is pivotally attached to the vane on actuator pivot mounts, 32A and 32B. In the depicted embodiment, actuator pivot mount, 32A, is fixedly attached, preferably by welding, on top of one of the fulcrum brackets, 30. In an alternate and equivalent embodiment, actuator pivot mount, 32A, could be placed in a more outboard position, for example, at a mirror image position to pivot mount, 32B, on the opposite edge of the vane. Actuator connection may be by other means and may engage the vane elsewhere. Piston rod actuation may also pivot on a mount located elsewhere on the vane, for example, towards the trailing end of the vane.

Seal reinforcing elbows, 120, are fixedly attached to the vane, 16, preferably by welding. Their outboard extent is co-extensive with the flat control plane, 116, or slightly wider. However, seal reinforcing elbows, 120, are not as wide as vane mounting brackets walls, 14.

The robust, simple and sturdy design of the multi-lobed actuator of the present invention allows for inexpensive fabrication and assembly. Moreover, the multi-lobed thrust vector controller of the present invention is easily retrofitted on the full spectrum of jet aircraft engines and turbo prop engines currently in use, making the present invention useful as a retrofit emergency control system. The present invention can also be applied to mixer nozzles on bypass engines that use different types of lobed mixers to reduce the exhaust temperature which are currently employed by more complex and expensive noise reduction systems. It is contemplated to be within the scope of the present invention that the multi-lobed vane assembly may be actuated by any known means including without limitation hydraulics and mechanical means, as well as the pneumatic means hereinafter disclosed.

Figure 10:
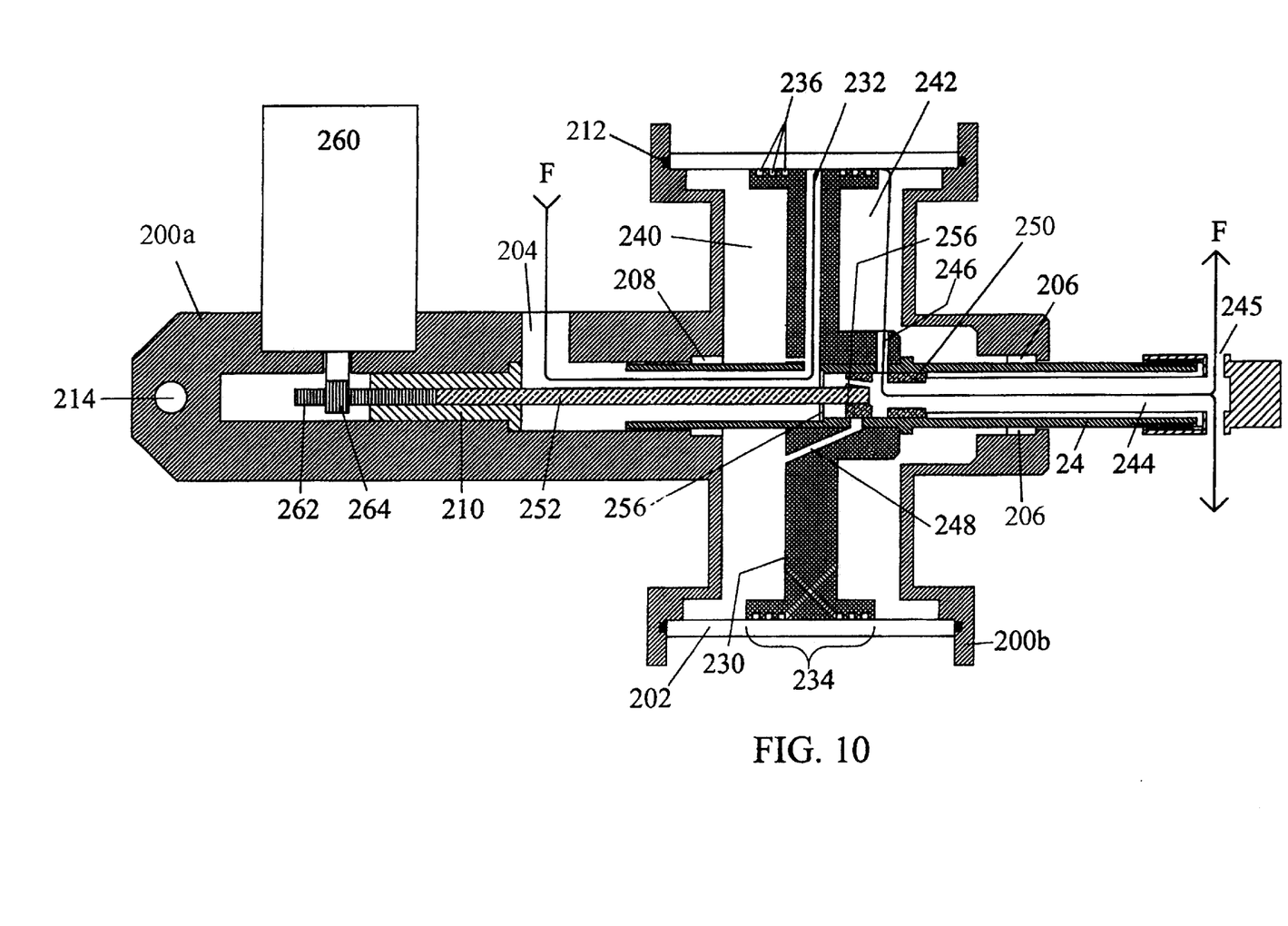
FIG. 10 is a cut away side view of the actuator of the thrust vector controller of the present invention with the piston rod in a retracted position.

FIG. 10 depicts the actuator of the present invention. The actuator is contained within housing, 200A and 200B, and an annular cylinder wall, 202, which remain fixed in relation to one another. They are attached to the jet engine housing at pivot mount, 214. Actuating piston rod, 24, is moved out to a position driving vanes, 16, into their constricting position when piston, 230, moves rearward, which is oriented to the right in FIG. 10. Movement of piston, 230, forwards, or to the left in FIG. 10, retracts piston rod, 24, moving vanes, 16, towards their out position.

Movement of piston, 230, is achieved by varying relative air pressures between two plenum pressure chambers; drive chamber, 240, and retraction chamber, 242. A constant flow of air runs from bleed air intake port, 204, through piston port, 232, through either or both of the chambers, 240 or 242, and out through the hollow core, 244, of piston rod, 24, to exhaust ports 245, cools the actuator. The air flow path is indicated by arrow F. This cooling effect allows the actuator to be used in hot environments where it would otherwise be impossible to use without temperature degradation. The expense of high temperature bearings is avoided. To the extent further cooling is needed, cooling coils may be added between the bleed air source and bleed air intake port, 204.

Pressure differentials between chambers, 240 and 242, drive the piston, 230, and piston rod, 24. Pressure differentials are initiated by valve, 250. Valve, 250, mediates the differential air flow between the retraction air chamber, 242, through hollow piston rod core, 244, and the drive air chamber, 240, through piston rod hollow core, 244. The piston rod hollow core, 244, opens to retraction air chamber, 242, through retraction port, 246. The piston rod hollow core, 244, opens to drive air chamber, 240, through drive chamber port, 248. The overall air pressure in both chambers, 240 and 242, in the depicted alternative embodiment is approximately 40 psi. By maintaining a relatively high pressure in both chambers, a small pressure differential initiates movement of piston, 230, and therefore initiates actuating force on piston rod, 24.

When valve, 250, obstructs drive chamber port, 248, air flow through that port is restricted. Concomitantly, air flow is increased through retraction chamber port, 246, increasing the pressure in retraction air chamber, 242, to a degree sufficient to force piston, 230 in a direction retracting piston rod, 24, which is to the left in FIG. 10. In this way, the vane is retracted by selecting the retraction air chamber port with the valve.

Figure 12:
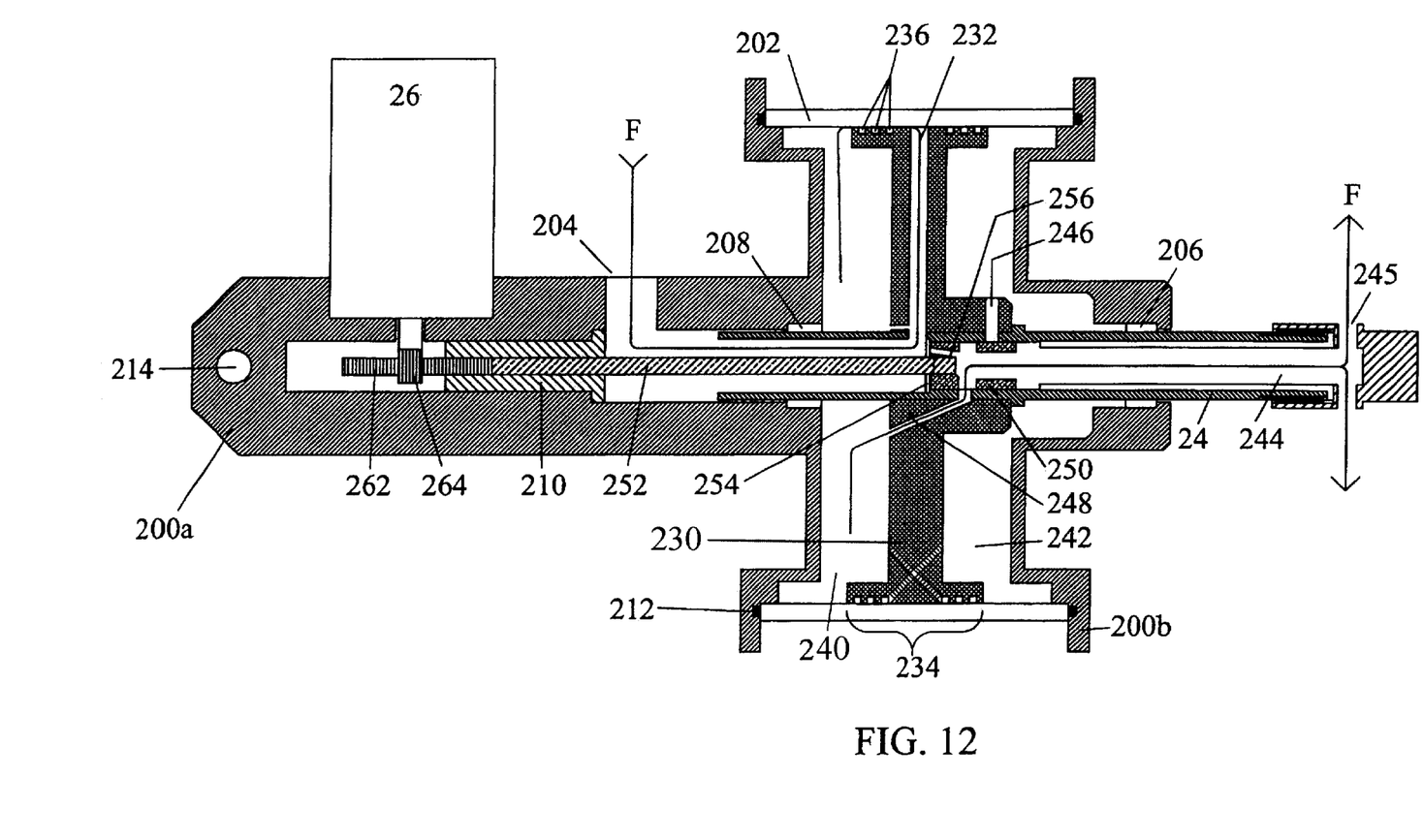
FIG. 12 is a cut away side view of the actuator of the thrust vector controller of the present invention with the piston rod in a constricting position.

When valve, 250, is moved into a position obstructing retraction air chamber port, 246, as in FIG. 12, air flow is increased through drive air chamber port, 248, increasing pressure in drive air chamber, 240, while decreasing pressure in retraction air chamber, 242, initiating driving or actuating force on piston rod, 24, and moving piston, 230, in the drive direction, which is to the right in FIG. 12. Selecting drive chamber port, 248, constricts the connected vane.

The requirement for only a small initiating force allows valve, 250, to be actuatable with only a small force. This small force is provided in the depicted alternative embodiment by a DC servo motor, 260, which may be powered by small batteries such as a 6 watt battery supplying twelve volts at ½ amps. Valve control rod, 252, has a fixed extension to a gear rack, 262, driven by a pinion gear, 264. The pinion gear is driven by the servo motor, 260.

Actuation of the piston rod, 24, is by manipulating pressure differentials between drive pressure chamber, 240, and retraction pressure chamber, 242. Air flow to plenum chambers, 240 and 242, is through piston port, 232. In the depicted alternative embodiment, eight evenly spaced radial ports, 232, distribute air evenly around the piston, 230, and along annular piston flange, 234. The respective outer diameter of piston, 230, at flange, 234, is machined to a relatively moderate tolerance in relation to the inner diameter of cylinder wall, 202. In the depicted alternative embodiment this tolerance is on the order of a few thousandths of an inch. The air flow out of piston ports, 232, fills this space, creating a frictionless air bearing between annular piston flange, 234, and the inner diameter of cylinder wall, 202. Annular grooves, 236, in the piston annular flange, 234, reduce leakage, allow for more clearance for a given leak or flow rate and improve the actuator's tolerance to particles in the air stream. This air flow creates a relatively high and relatively equal pressure in both plenum chambers, 240 and 242. In the depicted alternative embodiment, this pressure is approximately 40 psi.

Alternative embodiments within the scope of the present invention may route air flow to the plenum chambers, 240 and 242, by a route other than piston port 232. Moreover, alternative embodiments may seek to favor or bias the air flow and speed of increasing pressure for one chamber over the other chamber by rerouting or adding additional ports such as, for example, port 270 in FIG. 11. Biasing extra air flow towards one of the other chambers may also be achieved by reducing the diameter of the piston flange on the side of the chamber to receive increased air flow, relative to the diameter of the piston flange facing the other chamber.

Piston rod, 24, housing, 200, piston, 230, cylinder wall, 202, valve, 250, and valve control rod, 252, are all co-axial. Piston rod, 24, slides along seals created by bronze bushings, 206 and 208. Valve control rod, 252, slides along teflon bushing, 210. "O" rings, 212, seal the fixed connection between cylinder wall, 202, and housing sections, 200A and 200B.

Responsiveness of valve, 250, to the force generated by servo motor, 260, is augmented by reducing air flow to the valve, 250, with teflon disk, 254. Teflon disk, 254, is held in place by air flow in a seat in the hollow core, 244, of piston rod, 24. Any residual air pressure that may exist between valve, 250, and teflon disk, 254, is released through vent, 256.

It is contemplated to be within the scope of this invention that differing numbers of piston ports, 232, may be used. They may be designed in symmetrical pairs to even out air pressure used for the air friction bearing. It is contemplated to be within the scope of the present invention that varying numbers of drive chamber ports, 248, and retraction chamber ports, 246, may be used as well.

The use of bleed air as a pressure source for the actuator is advantageous in that the pressure source is available at all times that the engine is running; that is, at all times that thrust vector control is needed. The complexity, unreliability, and risks of a contaminating leak or performance degradation by leaking are all eliminated by elimination of auxiliary systems. Moreover, the pressure supply is proportional to the thrust being generated by the engine. The bleed air source is preferably between the compressor and fuel injectors of the jet engine. Accordingly, when the engine thrust is increased, and additional pressure is needed for controlling thrust vectors, the needed additional pressure is automatically being generated and ported to the actuator. This makes stabilization easier to achieve at varying speeds and thrust levels.

Finally, since the drive compression chamber and retraction compression chamber operate at similar pressures, with only a small differential in pressure needed to actuate piston movement, only a small DC battery is needed to operate the thrust vector controller. The use of a small DC battery, which is charged by a generator through a blocking diode, makes the required power source independent of the general aircraft systems, and immune from a catastrophic failure of those systems. Accordingly, the thrust vector controller of the present invention is ideally suited as an emergency backup steering system for all types of aircrafts currently using jet or turbo prop engines.

Figure 11:
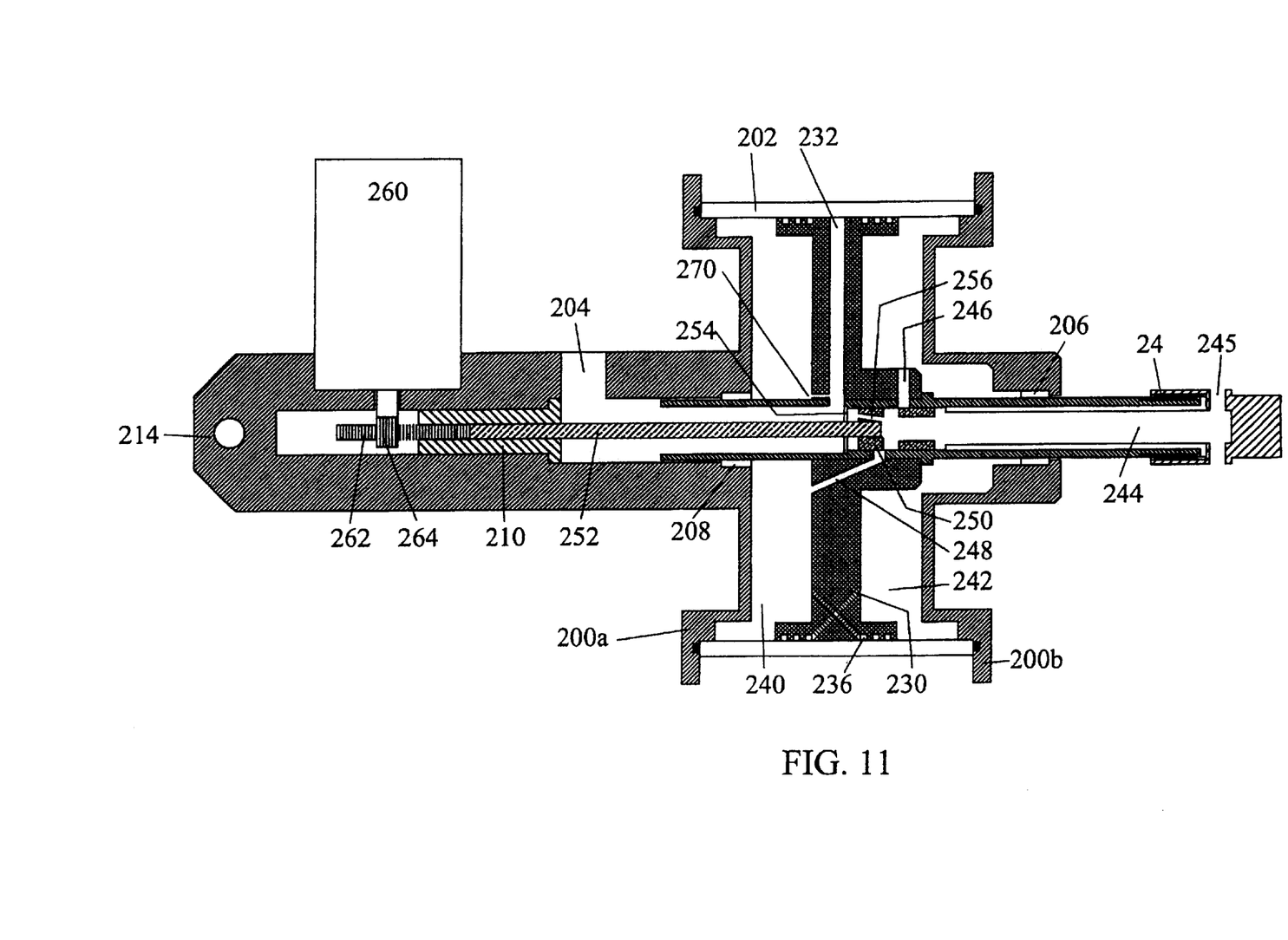
FIG. 11 is a cut away side view of the actuator of the thrust vector controller of the present invention with the piston rod in a neutral position.

In the depicted alternative embodiment, valve, 250, can be placed to completely block either drive chamber port, 248, or retraction chamber port, 246. However, in operation it is advantageous to maintain a small proportion of residual air flow through the restricted, non-selected port. This improves fine control and responsiveness. Sensor and control circuits are known to monitor and direct piston travel rates to avoid over shoot, oscillation and response lags associated with binary systems that are completely on or off. Also valve, 250, may be placed in a neutral position where both ports, 246 and 248, are almost completely blocked. FIG. 11 depicts the actuator of the present invention with piston, 230, and valve, 250, in the neutral position. A small air flow is maintained through each port in this neutral position eliminating any "dead band" in fine control and allowing for continuous air flow through the actuator. The result is that the piston, 230, will closely follow the movement of the valve, 250, with an offset when the piston rod is working against the load of a working engine producing a propulsive exhaust thrust. Avoiding complete obstruction of either port, 246 or 248, at any point avoids a control lag that would be necessary for sufficient pressure to build up in the chamber with the unblocked port to overcome the residual pressure in the opposing chamber. By constantly maintaining some air flow to both chambers simultaneously, continuous and precise control is promoted.

Manual or automatic control of the actuator and thrust vector controller of the present invention are by known combinations of sensors, circuitry and gyroscopes. Actuator piston rod position and vane position may be monitored by any conventional position sensor. The pressure exerted by exhaust thrust, on the vane or otherwise, may also be measured by known pressure sensors. Continual analog position data for the vehicle may be monitored by traditional gyroscopes.

The data gathered by the aforementioned sensors may be displayed to a pilot, who may respond to the data by manually controlling the individual positions of the vanes through conventional variable resistor circuits conveying to servo motor, 260, appropriate signals for executing the desired energy application time, torque and starting and stopping positions. Alternatively, any of the known feedback technologies may be applied to maintain heading and attitude by gyroscopic control, maintain a set thrust vector by pressure sensor feedback into an actuator position controlling circuit. It is also considered to be within the scope of this invention that control may be by accelerometer, accelerometer pairs, or accelerometers combined with gyroscopes. Finally, combinations of the above control technologies are applicable to the present invention. This would be particularly appropriate for hovering and vertical takeoff and landing applications where a human pilot would control direction thrust vectoring while a gyroscopic feedback system controls attitude simultaneously.

In view of the foregoing, it will be seen that the several advantages of the invention are achieved and attained.

The embodiments were chosen and described in order to best explain the principles of the invention and its practical application to thereby enable others skilled in the art to best utilize the invention and various embodiments and with various modifications as are suited to the particular use contemplated.

As various modifications could be made in the constructions and method herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A thrust vector controller for a jet engine comprising:
   an actuator housing;
   a piston in said housing;
      maintained by an air bearing;
      in a disposition defining a drive air chamber; and
      defining a retraction air chamber;
   a piston rod having a first end and a second end;
      said first end being in operative engagement with said piston;
      and second end being in operative engagement with a thrust vector control surface; and
      said piston rod being hollow; and
      said piston rod having air exit ports;
   a valve disposed in said housing to mediate air flow through at least one drive air chamber port communicating with said drive air chamber and through at least one retraction air chamber port communicating with said retraction air chamber;
   a valve actuator in operative engagement with said valve;
   a bleed air intake port receiving a flow of bleed air from the jet engine, said bleed air intake port being disposed to supply air flow into said drive air chamber and into said retraction air chamber;
   whereby said piston rod is driven or retracted by selectively controlling air flow through said drive air chamber and said retraction air chamber to selectively bias said piston and whereby the air flow exits through said air exit ports in said hollow piston rod;
   a vane housing fixedly attached to the jet engine and proximate to an exhaust thrust of the jet engine and said housing having at least one lobe, said lobe having walls;
   at least one vane having edges, said vane further comprising:
      a fulcrum rotatably fixed to said at least one lobe;
      a pivot operatively engaged with said second end of said piston rod such that movement of said piston rod actuates translation of said at least one vane in relation to the exhaust of the jet engine;

a pressure surface disposed to selectively translate between a closed position that constricts the exhaust of the jet engine and an open position that does not constrict the exhaust of the jet engine;

an air flow continuity surface dimensioned to maintain a smooth flow of the exhaust of the jet engine over said vane when said pressure surface is in said open position and when said pressure surface is in said closed position and as said pressure surface translates between said open position and said closed position; and an air seal on each edge of said at least one vane, said air seal being dimensioned to maintain close cooperation with said walls of said at least one lobe such that leakage of the exhaust of the jet engine between each of said edges of said at least one vane and said walls of said at least one lobe is minimized.

2. The thrust vector controller of claim 1 wherein said air seal has at least one elbow.

3. The thrust vector controller of claim 1 wherein said at least one vane is dimensioned and disposed such that the exhaust of the jet engine may be directed to control roll.

4. The thrust vector controller of claim 1 further comprising a plurality of vanes, each of said vanes being independently translatable between said open and said closed positions.

5. The thrust vector controller of claim 1 wherein said piston, said piston rod and said valve are coaxial.

6. The thrust vector controller of claim 1 wherein said thrust vector controller is adapted to be retrofit on an existing jet engine.

7. The thrust vector controller of claim 1 wherein said thrust vector controller is adapted to control a high bypass engine.

8. The thrust vector controller of claim 1 wherein said valve actuator is powered by a DC battery.

9. The thrust vector controller for a jet engine of claim 1 wherein said thrust vector controller is operated by a sensor and control circuit system selected from the group consisting of: gyroscopes, accelerometers, accelerometer pairs, vane pressure sensors, vane position sensors, piston position sensors, piston rod position sensors, and valve position sensors.

10. The thrust vector controller of claim 9 wherein said sensor and control system circuits display sensor data to a pilot for manual control.

11. The thrust vector controller for a jet engine of claim 1 wherein said piston has at least one radial air flow port having a first end and a second end, said radial air flow port first end communicating with said bleed air intake port and said radial air flow port second end communicating with said drive air chamber and said retraction air chamber.

12. The thrust vector controller of claim 1 wherein air flow is biased towards either of said drive air chamber or retraction air chamber relative to the other of said drive air chamber or retraction air chamber.

13. A thrust vector control actuator for a jet engine comprising:

a housing;

a piston maintained in said housing;
  by an air bearing;
  in a disposition defining a drive air chamber; and
  a retraction air chamber;

a piston rod having a first end and a second end;
  said first end being in operative engagement with said piston;
  and second end being operatively engageable with a thrust vector control surface; and
  said piston rod being hollow; and
  said piston rod having air exit ports;

a valve disposed in said housing to communicate with said drive air chamber and with said retraction air chamber; and
  said valve being selectively positionable to mediate air flow through a drive air chamber port communicating with said driver chamber and through a retraction air chamber port communicating with said retraction air chamber;

a valve actuator in operative engagement with said valve;

a bleed air intake port receiving bleed air from the jet engine, said bleed air intake port being disposed to supply air flow into said drive air chamber and into said retraction air chamber, and, thereafter, into said hollow piston rod;

whereby said piston rod is driven or retracted by selectively controlling air flow through said drive air chamber and said retraction air chamber.

14. A method of controlling jet engine thrust comprising:

disposing proximate to a jet engine exhaust path a housing having at least one lobe;

supporting in said at least one lobe at least one moveable vane at a fulcrum such that the edges of said moveable vane closely cooperate with said at least one lobe but do not touch said at least one lobe;

moving said at least one moveable vane into the jet engine exhaust path to generate a thrust vector in a direction different than the jet engine exhaust path;

actuating said moving through a selectably positionable actuator linkage;

controlling said actuating step with a pneumatically driven piston by selectively varying pressure levels on either side of said pneumatically driven piston; and powering said actuating of said pneumatically driven piston with a flow of air bled from the jet engine being controlled.

15. The method of claim 14 wherein the flow of air is from a source other than the jet engine.

16. The method of claim 14 wherein said controlling step is by selectively controlling the flow of air into a drive air chamber through a drive air chamber port and the flow of air into a retraction air chamber through a retraction air chamber port.

17. The method of claim 16 wherein said selective controlling step allows flow of air through a non-selected control port at substantially all times.

* * * * *